United States Patent
Schlosser et al.

(10) Patent No.: US 6,641,150 B1
(45) Date of Patent: Nov. 4, 2003

(54) FABRICATED STEER AXLE ASSEMBLY

(75) Inventors: Kraig Schlosser, Columbia City, IN (US); Kent Davison, Columbia City, IN (US); Cortland Ratliff, Lansing, MI (US)

(73) Assignee: Dana Corporation, Toledo, OH (US)

( * ) Notice: Subject to any disclaimer, the term of this patent is extended or adjusted under 35 U.S.C. 154(b) by 73 days.

(21) Appl. No.: 09/859,174

(22) Filed: May 16, 2001

(51) Int. Cl.⁷ .................................................. B62D 7/18
(52) U.S. Cl. ...................... 280/93.512; 280/124.125; 180/905
(58) Field of Search ...................... 280/124.125, 93.512; 180/905, 253

(56) References Cited

U.S. PATENT DOCUMENTS

| | | |
|---|---|---|
| 1,762,407 A | 6/1930 | Mogford et al. |
| 1,841,735 A | 1/1932 | Hufferd et al. |
| 1,873,453 A | 8/1932 | Mogford et al. |
| 2,007,793 A | 7/1935 | Crawford ..................... 29/153 |
| 2,582,455 A | 1/1952 | Potter .......................... 280/103 |
| 3,804,467 A | 4/1974 | Austermann ................ 301/127 |
| D255,230 S | 6/1980 | Marti ......................... D12/160 |
| 4,361,360 A | 11/1982 | Kuether ...................... 301/127 |
| 5,350,183 A * | 9/1994 | Shealy .................. 280/93.512 |
| 5,588,660 A * | 12/1996 | Paddison ..................... 180/400 |
| 5,741,027 A * | 4/1998 | Stroh et al. .................. 180/905 |
| 5,865,452 A | 2/1999 | Chalin ................. 280/124.125 |
| 5,975,547 A * | 11/1999 | Stroh et al. ............. 280/93.512 |
| 6,071,032 A * | 6/2000 | Link .......................... 403/119 |
| 6,113,118 A * | 9/2000 | Zebolsky ............... 280/93.512 |
| 6,196,563 B1 * | 3/2001 | Haycraft ..................... 180/905 |
| 6,302,233 B1 * | 10/2001 | Okamuro et al. ........... 180/253 |
| 6,357,956 B1 * | 3/2002 | Zebolsky et al. ........... 277/635 |
| 6,367,825 B1 * | 4/2002 | Kilpatrick ................ 280/86.75 |
| 6,435,527 B1 * | 8/2002 | Katae .................... 280/86.758 |

* cited by examiner

Primary Examiner—Paul N. Dickson
Assistant Examiner—Toan To
(74) Attorney, Agent, or Firm—Dykema Gossett PLLC

(57) ABSTRACT

The inventive fabricated steer axle assembly includes an axle beam, a kingpin housing, and, a fabrication connecting the axle beam and kingpin housing. The kingpin housing comprises an open-ended cylindrical tube having a groove disposed proximate each end of the tube. The fabrication includes a first end and a second end and is bent around the kingpin housing so that the first and second ends may be attached to the axle beam. A continuous weld may be used to couple the ends of the fabrication to the axle beam and secure the ends of the fabrication together along a seam extending between the kingpin housing and the beam formed after bending the fabrication around the kingpin housing.

21 Claims, 1 Drawing Sheet

FABRICATED STEER AXLE ASSEMBLY

BACKGROUND OF THE INVENTION

1. Field of the Invention

This invention relates to a steer axle assembly and more particularly to a fabricated steer axle assembly designed to reduce the amount of required welding, materials and weight and to allow flexibility with respect to the drop of the axle.

2. Disclosure of Related Art

In a conventional steer axle assembly, an I-shaped or tubular beam extends along a longitudinal axis. Each end of the beam may define a boss having a through bore configured to receive a kingpin. A steering knuckle may be rotatably mounted on the kingpin. Variations in the drop of the axle (i.e., the variation in position of the steering knuckle and vehicle wheels relative to the longitudinal axis of the axle beam) are accomplished either by curving each end of the beam or by affixing a plurality of plates or other structural components to each end of the beam so that the boss is disposed on one side of the longitudinal axis of the beam. Most conventional steer axle assemblies are forged. A steer axle assembly may also be fabricated, however. A typical fabricated steer axle assembly is welded together from numerous pieces and/or contains numerous welds for reinforcement.

Conventional forged and fabricated steer axle assemblies suffer from several disadvantages. Forged steer axle assemblies are relatively heavy and inflexible with respect to design changes. Further, the extra material required for forging increases tooling, manufacturing, and assembly costs. Fabricated steer axle assemblies overcome some of the above-mentioned disadvantages associated with forged steer axle assemblies. Conventional fabricated steer axle assemblies, however, include numerous pieces and welds. The relatively large number of pieces and welds increases the costs of the assembly while decreasing the overall strength of the assembly.

There is thus a need for a steer axle assembly that will minimize or eliminate one or more of the above-mentioned deficiencies.

SUMMARY OF THE INVENTION

This invention relates to a steer axle assembly.

A steer axle assembly in accordance with the present invention includes an axle beam, a kingpin housing, and a fabrication connecting the axle beam and kingpin housing. The kingpin housing may comprise a tube having a groove proximate each end of the tube. The grooves may extend around the entire circumference of the tube. The fabrication includes a first end and a second end and is bent around the kingpin housing so that the first and second ends may be attached to the axle beam. The fabrication may then be welded along the seam extending between the kingpin housing and the beam formed after bending the fabrication around the kingpin housing.

A steer axle assembly in accordance with the present invention is advantageous as compared to conventional steer axle assemblies. The inventive assembly is lighter than a conventional forged assembly, requires less material to manufacture, and allows flexibility in the drop of the axle. The inventive assembly also has relatively few components and welds thereby producing a relatively strong assembly at a relatively low cost.

These and other features and objects of this invention will become apparent to one skilled in the art from the following detailed description and the accompanying drawings illustrating features of this invention by way of example.

DETAILED DESCRIPTION OF THE PREFERRED EMBODIMENTS

Figure 1:
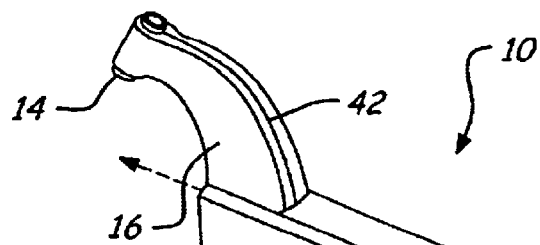
FIG. 1 is a perspective view of a steer able assembly in accordance with the present invention.
Figure 2:
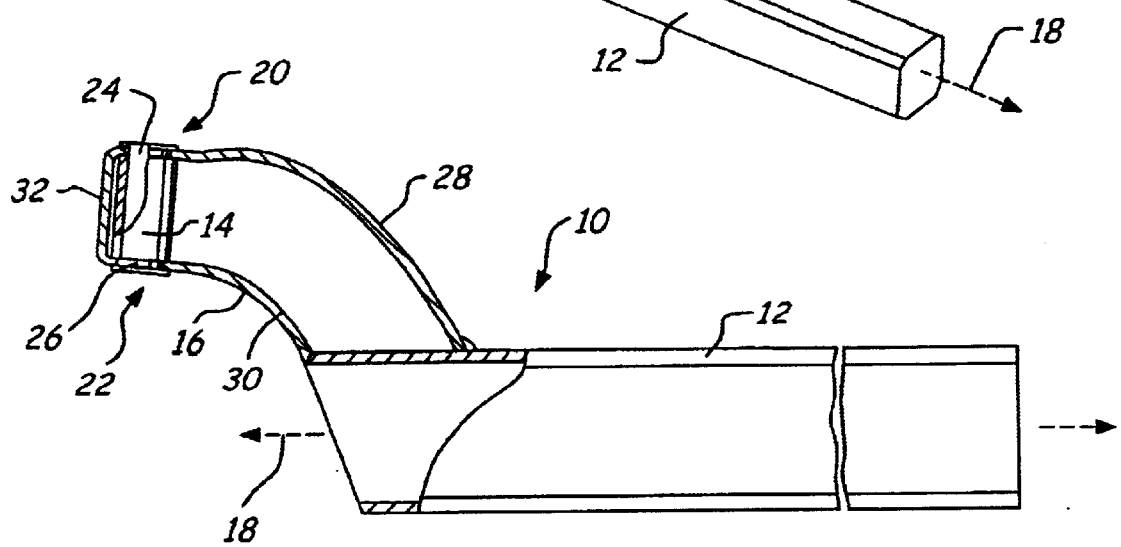
FIG. 2 is a cross-sectional view of the steer axle assembly of FIG. 1.

Referring now to the drawings wherein like reference numerals are used to identify identical components in the various views, FIGS. 1–2 illustrate a steer axle assembly 10 in accordance with the present invention. Assembly 10 is provided for use in a vehicle to support the components of a pair of wheel assemblies disposed on opposite sides of the vehicle including, for example, steering knuckles (not shown) and wheel hubs (not shown). Assembly 10 is particularly adapted for use in large trucks. It should be understood, however, that the present invention may find application in a wide variety of vehicles. Assembly 10 includes an axle beam 12, a kingpin housing 14, and a fabrication 16. In the illustrated embodiment, only one end of the axle assembly 10 is illustrated. It should be understood, however, that the other end of assembly 10 may be similarly constructed. In particular, the other end of beam 12 may include a similar housing 14 and fabrication 16.

Beam 12 is provided to support a vehicle frame (not shown) on wheels (not shown) disposed proximate either end of beam 12. Beam 12 may be made from conventional metals and metal alloys such as steel and may be forged or fabricated. Beam 12 may extend along a longitudinal axis 18. Beam 12 may be tubular, as shown, and may be shaped so as to have a generally rectangular cross-section in planes extending perpendicular to axis 18. It should be understood by those of skill in the art, however, that the cross-sectional shape of beam 12 may be varied and that beam 12 may have cross-sections of varying shape in planes perpendicular to axis 18 without departing from the spirit of the present invention.

Kingpin housing 14 is provided to receive a kingpin (not shown) on which a steering knuckle (not shown) may be mounted to allow rotation of the vehicle wheels (not shown). Housing 14 may be made from steel or other conventional metals or metal alloys. Housing 14 may comprise a generally cylindrical tube that is open at both ends 20, 22 and may include grooves 24, 26 (best shown in FIG. 3) proximate each end 20, 22. Grooves 24, 26 may extend around the entire circumference of housing and are provided to receive a portion of fabrication 16 in order to secure housing 14 against movement within fabrication 16.

Figure 3:
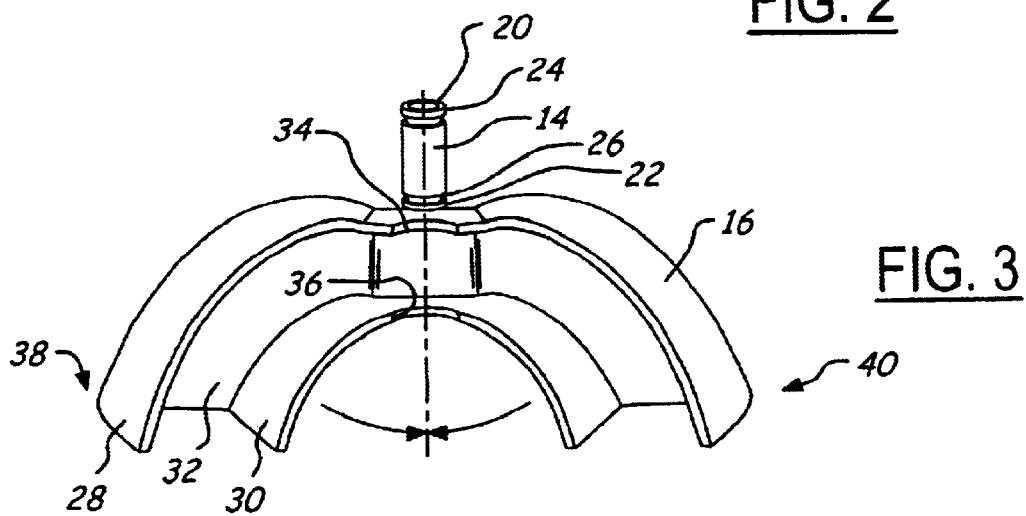
FIGS. 3–4 are perspective and top view illustrating steps in a method of manufacturing a steer axle assembly in accordance with the present invention.

Fabrication 16 is provided to couple beam 12 and housing 14 and to allow variation in the drop of the axle. Fabrication 16 may also be made from steel or other conventional metals or metal alloys. Referring to FIG. 3, fabrication 16 is illustrated prior to assembly within assembly 10. Fabrication 16 may be made through a conventional blanking process and may be unitary in construction and symmetrical in shape. Prior to assembly, fabrication 16 includes top, bottom, and side walls 28, 30, 32, respectively, defining a C-shaped channel. Top and bottom walls 28, 30 define notches 34, 36 configured to receive kingpin housing 14 upon assembly. Fabrication 16 has a first end 38 and a second end 40 each of which may be coupled to beam 12 through welding or in other ways conventional in the art. Referring again to FIGS. 1 and 2, fabrication 16 may be coupled to an external surface of beam 12 and may be disposed on one side of longitudinal axis 18. In the illustrated embodiment, at least a portion of fabrication 16 curves toward axis 18 as fabrication 16 extends in an outboard direction from beam 12. It should be understood that the length, shape, and configuration of fabrication 16 may be varied in order to vary the drop of the axle. The length, shape, and configuration of fabrication 16 may be adjusted using any of a variety of conventional forming methods either before capture of housing 14 or after capture of housing 14 within fabrication 16 and prior to coupling of fabrication 16 to beam 12.

Figure 4:
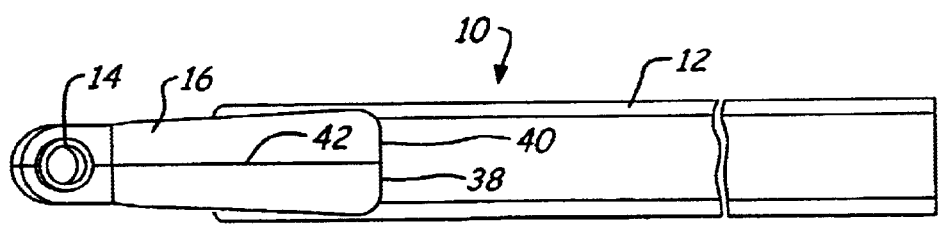

Referring now to FIGS. 3–4, a method of manufacturing a steer axle assembly in accordance with the present invention will be described. The method may first include the step of providing beam 12, housing 14, and fabrication 16. Prior to assembly, fabrication 16 may appear as illustrated in FIG. 3. However, the shape and configuration of fabrication 16 may be varied without departing from the spirit of the present invention.

The method of manufacture may also include the step of shaping fabrication 16 in order to couple beam 12 and housing 14 and form assembly 10. Referring to FIGS. 3–4, this step may include the substep of bending fabrication 16 around housing 14 so that ends 38, 40 of fabrication 16 are adjacent to one another and may be coupled to beam 12. During this substep, the portions of walls 28, 30 of fabrication 16 that define notches 34, 36 are received within grooves 24, 26 of housing 14 so that housing 14 is secured against movement within fabrication 16.

The method of manufacture may further include the step of coupling fabrication 16 to beam 12 as illustrated in FIGS. 1–2 and 4. Ends 38, 40 of fabrication 16 may be coupled to beam 12 by welding or in other ways conventional in the art. The method of manufacturing assembly 10 may also include the step of welding a pair of seams 42 (only one of which is shown in FIG. 1) formed in fabrication 16 and extending between kingpin housing 14 and beam 12 after bending fabrication 16 around housing 14. The seams 42 are defined by the edges of top and bottom walls 28, 30. In accordance with the present invention, assembly 10 reduces the number of welds required to fashion assembly 10. In particular, a single continuous weld may be used to weld housing 14 to fabrication 16, weld seams 42 of fabrication 16 and couple ends 38, 40 of fabrication 16 to beam 12.

In addition to the above-described steps, the method of manufacturing assembly 10 may also include the step of adjusting the length, shape, or configuration of fabrication 16 prior to welding ends 38, 40 to beam 12 or welding seams 42 so as to allow variation in the drop of the axle. In this manner, the present invention allows relatively easy variation in the axle drop as compared to many conventional steer axle assemblies in which additional plates and welds are required.

A steer axle assembly 10 in accordance with the present invention represents a significant improvement as compared to conventional steer axle assemblies. In particular, assembly 10 weighs less and requires less material than forged steer axle assemblies. Moreover, the inventive assembly 10 allows relatively easy variation in the drop of the axle either through adjusting the length of fabrication 16 during assembly or through construction of fabrications of varying lengths, shapes, and configurations. As compared to conventional fabricated steer axle assemblies, the inventive assembly 10 requires relatively few components and welds. In particular, fabrication 16 is formed from a single piece and may be coupled to beam 12 and housing 14 using a single continuous weld. As a result, the inventive assembly is easier to build and stronger than conventional fabricated assemblies.

While the invention has been particularly shown and described with reference to the preferred embodiments thereof, it is well understood by those skilled in the art that various changes and modifications can be made in the invention without departing from the spirit and scope of the invention.

We claim:

1. A steer axle assembly comprising:
   an axle beam;
   a kingpin housing; and,
   a fabrication connecting said axle beam and said kingpin housing,
   wherein said fabrication includes a first end and a second end and said fabrication surrounds said kingpin housing so that said first and second ends are attached to said axle beam.

2. The assembly of claim 1 wherein said fabrication curves toward a longitudinal axis of said axle beam as said fabrication extends in an outboard direction.

3. The assembly of claim 1 wherein said fabrication is coupled to an external surface of said axle beam.

4. The assembly of claim 1 wherein said fabrication is disposed on one side of a longitudinal axis extending through said axle beam.

5. A steer axle assembly comprising:
   an axle beam;
   a kingpin housing; and,
   a fabrication connecting said axle beam and said kingpin housing
   wherein said fabrication is unitary in construction and includes a first end and a second end and said fabrication surrounds said kingpin housing so that said first and second ends are attached to said axle beam.

6. The assembly of claim 5 wherein said fabrication curves toward a longitudinal axis of said axle beam as said fabrication extends in an outboard direction.

7. The assembly of claim 5 therein said fabrication is coupled to an external surface of said axle beam.

8. The assembly of claims 5 wherein said fabrication is disposed on one side of a longitudinal axis extending through said axle beam.

9. A steer axle assembly comprising:
   an axle beam;
   a kingpin housing; and,
   a fabrication connecting said axle beam and said kingpin housing
   wherein said fabrication includes a first end and a second end and said fabrication surrounds said kingpin housing so that said first and second ends are attached to said axle beam and a single continuous weld attaches said fabrication to said axle beam and said fabrication to said kingpin housing.

10. The assembly of claim 9 wherein said fabrication curves toward said longitudinal axis of said axle beam as said fabrication extends in an outboard direction.

11. The assembly of claim 9 wherein said fabrication is coupled to an external surface of said axle beam.

12. The assembly of claim 9 wherein said fabrication includes a top wall, a bottom wall, and a side wall connecting said top and bottom walls, said top wall received within a first groove in said kingpin housing and said bottom wall received within a second groove in said kingpin housing.

13. The assembly of claim 12 wherein said side wall does not contact said kingpin housing.

14. The assembly of claim 12 wherein said top and bottom walls surround said kingpin housing.

15. The assembly of claim 9 wherein said fabrication is unitary in construction.

16. A steer axle assembly comprising:

an axle beam;

a kingpin housing; and, a fabrication connecting said axle beam and said kingpin housing, wherein said fabrication includes a first end and a second end and said fabrication surrounds said kingpin housing so that said first and second ends are attached to said axle beam and said fabrication includes a top wall, a bottom wall, and a side wall connecting said top and bottom walls, said top wall received within a first groove in said kingpin housing and said bottom wall received within a second groove in said kingpin housing.

17. The assembly of claim 16 wherein said side wall does not contact said kingpin housing.

18. The assembly of claim 16 wherein said top and bottom walls surround said kingpin housing.

19. A steer axle assembly comprising:

an axle beam;

a kingpin housing; and, a fabrication connecting said axle beam and said kingpin housing wherein said fabrication is unitary in construction and includes a first end and a second end and said fabrication surrounds said kingpin housing so that said first and second ends are attached to said axle beam and said fabrication includes a top wall, a bottom wall, and a side wall connecting said top and bottom walls, said top wall received within a first groove in said kingpin housing and said bottom wall received within a second groove in said kingpin housing.

20. The assembly of claim 19 wherein said side wall does not contact said kingpin housing.

21. The assembly of claim 19 wherein said top and bottom walls surround said kingpin housing.

* * * * *